C. C. BLAKE AND M. E. FERNALD.
MACHINE FOR UPDRAWING UPPERS.
APPLICATION FILED APR. 14, 1915. RENEWED JULY 19, 1921.

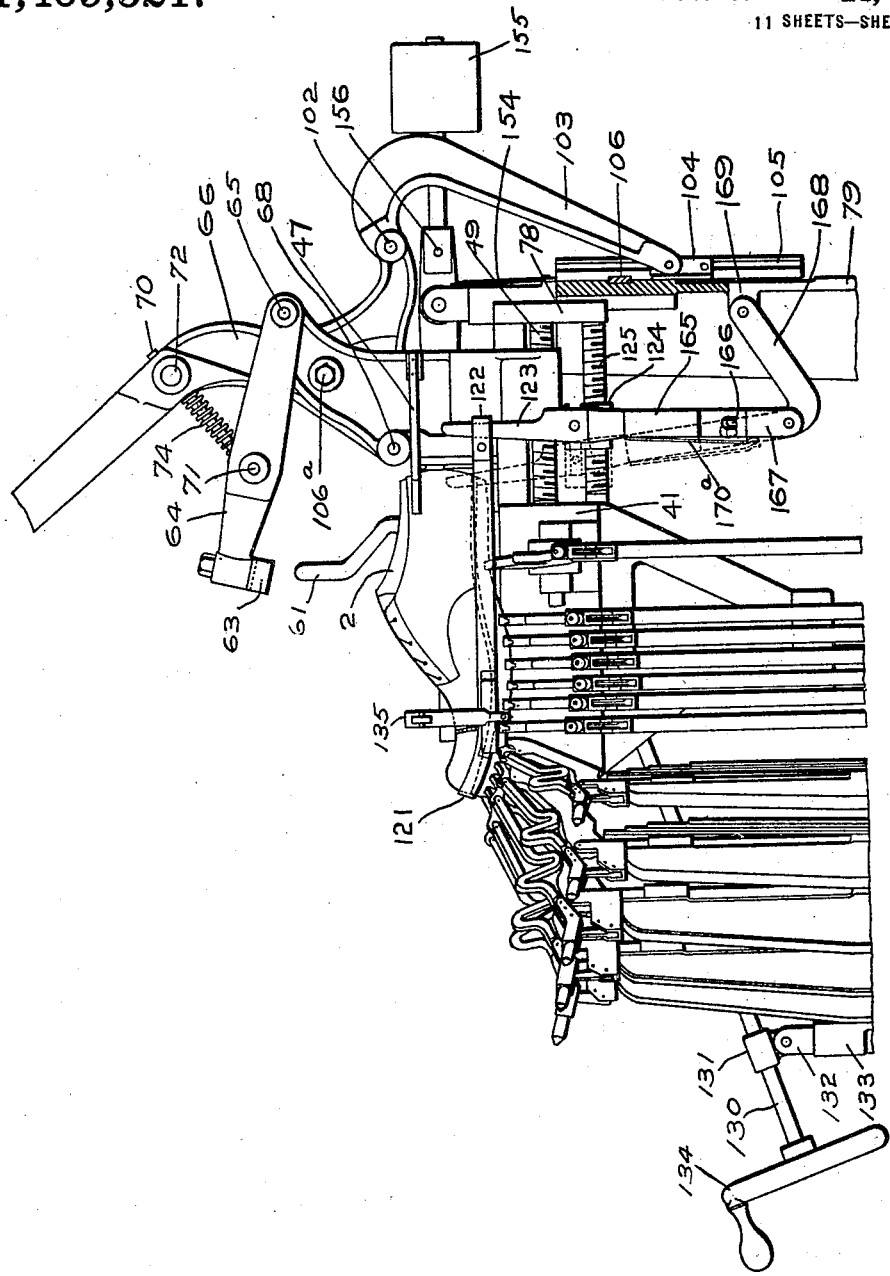

1,409,521.

Patented Mar. 14, 1922.
11 SHEETS—SHEET 4.

Witnesses:

Inventors,

C. C. BLAKE AND M. E. FERNALD.
MACHINE FOR UPDRAWING UPPERS.
APPLICATION FILED APR. 14, 1915. RENEWED JULY 19, 1921.
1,409,521.
Patented Mar. 14, 1922.
11 SHEETS—SHEET 7.
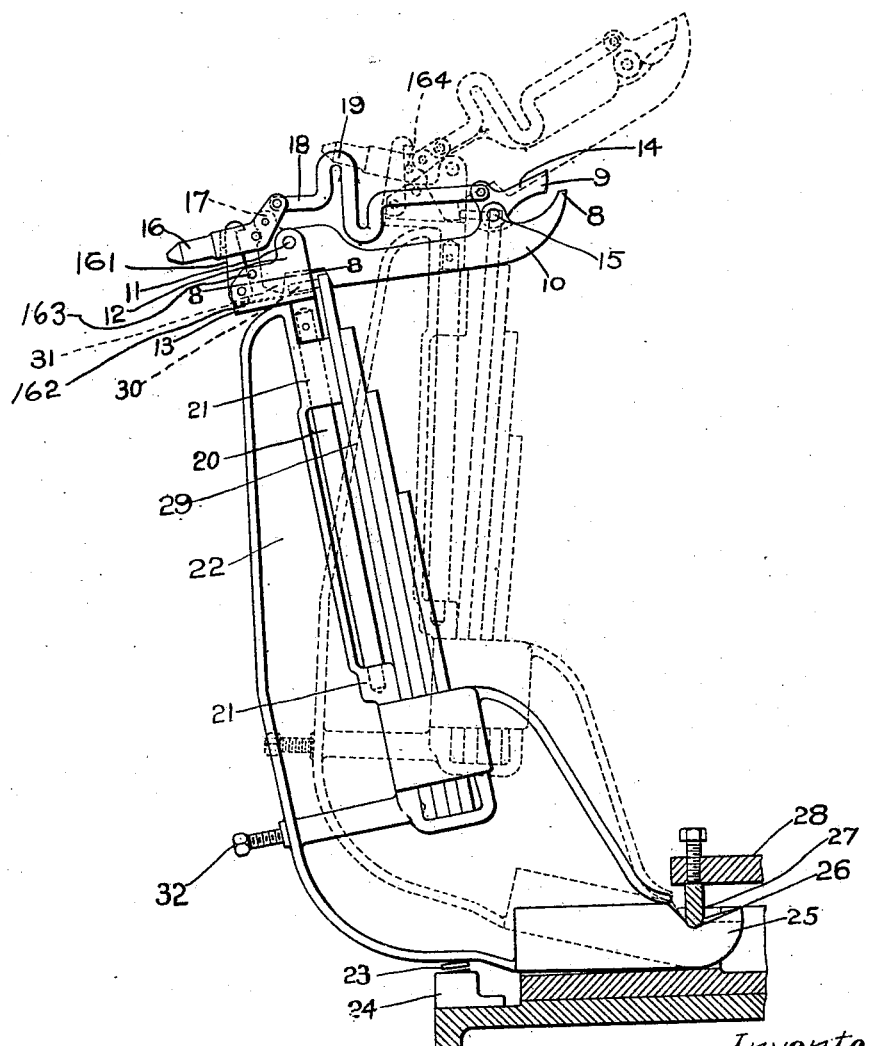

C. C. BLAKE AND M. E. FERNALD.
MACHINE FOR UPDRAWING UPPERS.
APPLICATION FILED APR. 14, 1915. RENEWED JULY 19, 1921.

1,409,521. Patented Mar. 14, 1922.
11 SHEETS—SHEET 11.

UNITED STATES PATENT OFFICE.

CHARLES C. BLAKE, OF BROOKLINE, AND MARK E. FERNALD, OF SAUGUS, MASSACHUSETTS.

MACHINE FOR UPDRAWING UPPERS.

1,409,521.   Specification of Letters Patent.   Patented Mar. 14, 1922.

Application filed April 14, 1915, Serial No. 21,424. Renewed July 19, 1921. Serial No. 485,851.

*To all whom it may concern:*

Be it known that we, CHARLES C. BLAKE and MARK E. FERNALD, citizens of the United States, residing, respectively, at Brookline, in the county of Norfolk and State of Massachusetts, and at Saugus, in the county of Essex and State of Massachusetts, have invented a new and useful Improvement in a Machine for Updrawing Uppers, of which the following is a specification.

The present invention relates to the manufacture of shoes.

One of the critical operations in the manufacture of shoes is the fitting of the upper to the last which determines the shape of the shoe. The upper is cut from the pattern which is drafted by a pattern drafter. In drafting a pattern for producing an upper to fit a particular last the drafter places two lines on the upper surface of the forepart of the last, one of which is called the lead line and the other of which is called the tip-seam line. The lead line lies in a vertical plane bisecting the arch of the last. The tip-seam line lies in a vertical plane perpendicular to the plane of the lead line and is located substantially one-fifth of the length of the last from the tip of the toe. With the lead line as a guide it is a comparatively easy matter to draft a pattern for producing an upper which, when assembled on the last, will have the lacing slit thereon arranged in a vertical plane passed longitudinally through the lead line. It is more difficult when using the tip-seam line on the last as a guide to predetermine the position of the tip-seam on the upper for the reason that the drafter must calculate the amount of longitudinal stretch of the upper so that the tip-seam of the upper will coincide with the tip-seam line on the last only after the upper has been stretched on the last. Consequently the tip-seam line on the assembled upper must be located back of the tip-seam line on the last a distance equal to the amount of longitudinal stretch of the upper. After the upper is prepared in the manner described a notch is cut in the tip end of the toe of the upper which is arranged in the vertical plane passed longitudinally through the lead line and lacing slit. If the upper is assembled on the last so that the lacing slit and notch lie in a vertical plane passed longitudinally through the lead line it will be apparent that the upper is positioned for the lasting operation in the manner predetermined by the pattern drafter. Notwithstanding the fact that the art of drafting patterns for cutting uppers to fit their lasts is highly developed, it has been considered necessary heretofore to apply tension at the tip-end of the toe and at the ends of the tip-seam and then haul the tensioned upper longitudinally and transversely on the last until the lacing slit and tip-seam are, in the opinion of the one doing the hauling, properly positioned for the lasting operation. This operation, called "pulling-over," obviously defeats the object of the skilled pattern maker. The pattern drafter knows the proper lasting position for the upper but experience has demonstrated that the shoe makers do not take advantage of this knowledge.

One of the objects of the present invention is to produce an upper fitting machine by means of which advantage may be taken of the knowledge and skill of the pattern drafter thus eliminating the necessity of a pulling-over operation and insuring the proper fitting of the upper to the last.

To the accomplishment of this object a feature of the invention contemplates the provision in an upper fitting machine, of a critical gripper arranged to engage the tip-end of the upper and constrained to operate in a fixed path and a pair of floating grippers arranged on opposite sides of the shoe in position to engage the ends of the tip-seam. Broadly considered the critical grippers may be mounted to operate in any suitable manner found desirable or expedient. It is preferred, however, to constrain the critical toe gripper to operate in a vertical plane and to mount the floating critical tip-seam grippers to operate in slots arranged in a vertical plane perpendicular to the first plane as this construction permits the tip-seam grippers to be moved manually out of the second plane to initially engage the ends of the tip-seam on the upper and to be moved automatically back into the second plane to cause the tip-seam of the upper to coincide with the tip-line on the last.

Heretofore all lasting machines or other upper fitting machines for use in the manufacture of welt shoes whether pulling-over machines, bed lasting machines or hand method lasting machines have always drawn the updrawn upper over the insole on the bottom of the last in position to be secured. As the circumference of the bottom of the last measured within the edge is considerably less than the circumference measured at the edge of the last it is obvious that to lay the overdrawn upper upon the insole necessitates the formation of a large number of folds in the upper. These folds cause a great deal of trouble as they often extend beyond the edge of the last and make themselves visible along the sides of the shoe.

Another object of the invention is to minimize the production of folds in the upper.

To the accomplishment of this object another feature of the present invention contemplates the provision, in a machine for fitting the uppers of welt shoes, of means for updrawing the upper, and means for fitting the updrawn upper in updrawn position to the edge face of the insole. With this construction the overdraw movement of the upper is omitted thereby obviating the formation of the folds heretofore formed by the overdrawing lasting devices.

In addition to the features of the invention above referred to other features of the invention consist in certain devices, combinations and arrangements of parts as fully set forth hereinafter, the advantages of which will be readily understood by those skilled in the art.

The various features of the present invention will be readily understood from an inspection of the accompanying drawings illustrating the best form of the invention now known to the inventors, in which, Figure 1 is a perspective of the machine showing the grippers engaged with an upper positioned on a last clamped to the work rests which are in their depressed positions.

Fig. 3 is a detail in side elevation of the parts in the position of Fig. 2 with the addition of the binder which binds the updrawn upper against the insole on the last, and the clamp which holds the bound upper;

Fig. 7 is a detail of one of the grippers and its supporting devices;

Fig. 8 is a sectional plan on the line 8—8, Fig. 7;

Figure 12:
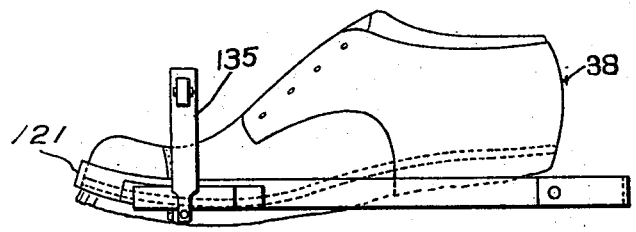
Fig. 12 is a side elevation of the fitted shoe removed from the machine.
Figure 13:
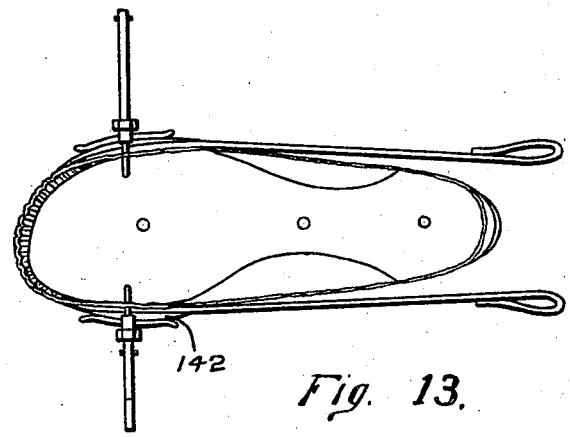
Fig. 13 is a plan of the fitted shoe.
Figure 14:
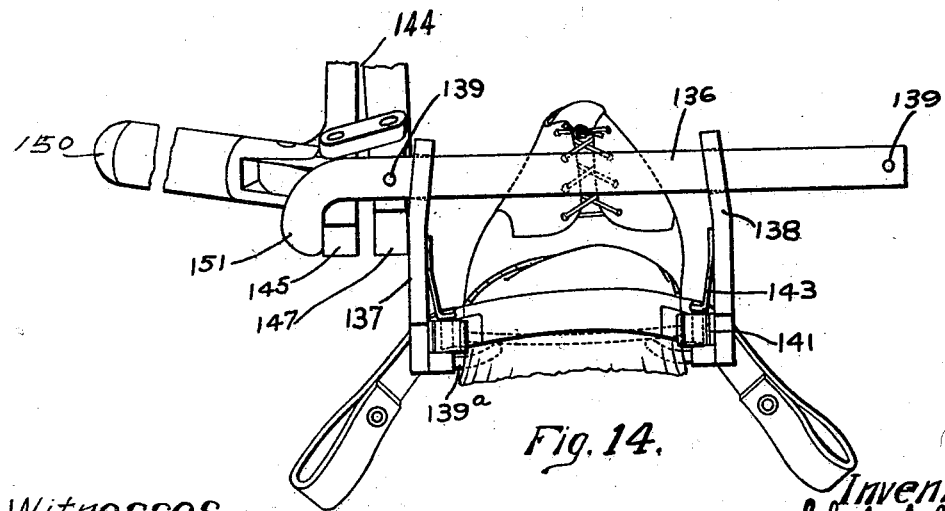
Fig. 14 is a front elevation of the fitted shoe.

Referring now to Figs. 1, 2, 3 and 4 for a preliminary general description of the machine embodying the features of the present invention the upper on the last is gripped around the forepart by a plurality of grippers which are moved in and closed upon the upper by the operative while the last is in a depressed position and while it is clamped to its work rest. Power-driven mechanism is then thrown into operation to elevate the last against the resistance offered by the pull of the grippers to updraw the upper and thus stretch it and draw it to the wood of the last. The power-driven mechanism is then thrown out of operation and the last is brought to rest in an elevated position. During the elevation of the last the clamp which binds the last to the work rest is automatically released. The parts are now in the position of Fig. 2. Referring now to Fig. 3 a binder of leather or other continuous or strip material is positioned around the upper and tensioned to bind the updrawn upper against the edge face of the insole. The binder is then clamped in its tensioned position by a clamp having jaws arranged to embrace the binder on opposite sides of the shoe. The last is now permitted to descend, under the influence of gravity and the pull of the grippers, to its original depressed position. During the descent of the last the grippers are automatically opened to release the upper and the binder is disengaged from its tension device thus permitting the operative to readily remove the unclamped last from the machine. The product of the machine is illustrated in Figs. 12, 13 and 14.

Figure 5:
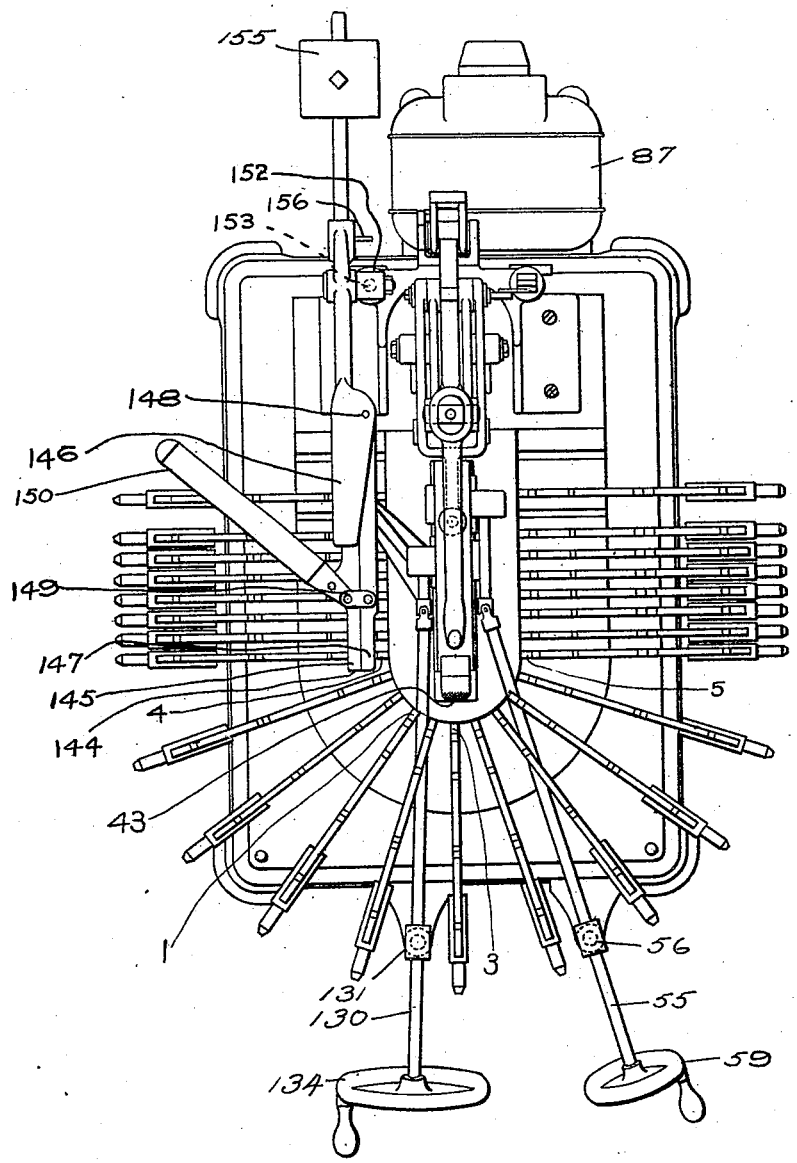
Fig. 5 is a plan.

The embodiment of the invention illustrated in the drawings is provided with a series of grippers 1 (Fig. 5) herein shown as twenty-five in number, which are arranged around the forepart of a last 2 (Fig.

4) having assembled thereon the insole and upper and parts within it, hereinafter for brevity termed the "shoe".

As hereinbefore stated, if the upper is assembled on the last so that the lacing slit and notch lie in a vertical plane passed longitudinally through the lead line it will be apparent that the upper is positioned for the lasting operation in the manner predetermined by the pattern drafter. If the upper is lasted after being assembled in this position the tip-seam line of the upper will be stretched forward to coincide with the tip-seam line on the last. Similarly all the other parts of the upper will be drawn to the wood of the last in a natural position. An attempt to place the upper in any position other than the proper assembled one will only result in straining the upper into an unnatural position on the last resulting in a botch the strained lines of which will soon make their appearance in the use of the shoe.

In our upper fitting machine we propose to take advantage of the knowledge and skill of the pattern drafter. To this end we center the last in the machine so that the lead line on the last registers with the center line of the machine and we also engage the portion of upper surrounding the notch with a gripper 3 (Fig. 5) which is constrained to move into upper-engaging position in a vertical plane intersecting the notch, the lead line and the lacing slit. Two floating grippers, namely, the grippers 4 and 5, are then engaged with the ends of the tip-seam which are at this time located back of the tip-seam line on the last. After these three grippers, herein called the critical grippers, engage the upper the remaining grippers are caused to engage the upper in an orderly manner. Then when the last and grippers are relatively actuated to impart an updraw movement to the upper the upper is stretched forwardly and transversely. During the updraw movement the gripper 3 continues to operate in the vertical plane intersecting the notch, the lead line and the lacing slit. The grippers 4 and 5, however, turn towards the toe of the shoe under the influence of the toe grippers in stretching the upper longitudinally and thus carry the tip-seam of the upper forwardly so that it coincides with the tip-seam line on the last. With this construction and mode of operation the upper may be drawn to the wood of the last in the position predetermined for it by the pattern drafter without that adjustment of the upper on the last which is a characteristic feature of the present commercial hand and machine methods of pulling-over.

Figure 6:
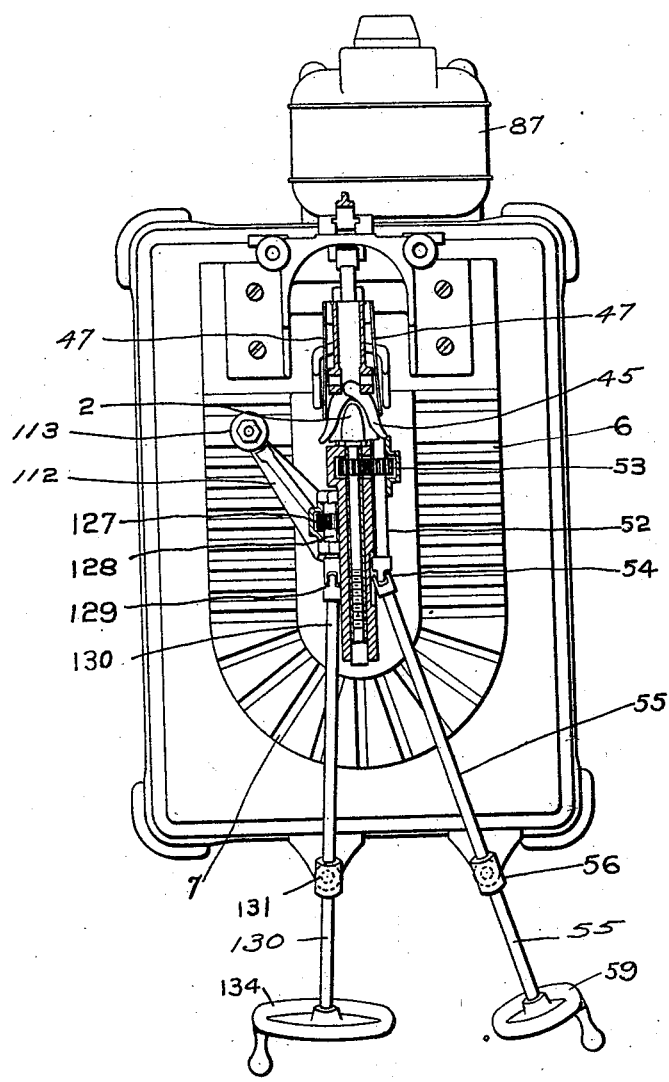
Fig. 6 is a sectional plan on the line 6—6, Fig. 4, the grippers being removed to show the slots which contain the grippers supports.

As shown in Fig. 6 the grippers 4 and 5 and all of the other grippers for lasting the sides of the shoe operate in parallel slots 6 (Fig. 6) formed in the upper surface of the machine frame. The slots 6 which contain the grippers 4 and 5 are arranged in the vertical plane which passes through the tip-seam line of the last. The grippers 3 and all of the other grippers for fitting the upper at the toe of the shoe operate in slots 7 which radiate from a common point lying in the vertical plane of the tip-seam line of the last.

The grippers (Fig. 7) comprise a lower jaw 8 and an upper jaw 9. The lower jaw is formed on a bar 10 which is pivoted at 11 to move between plates 12 (Fig. 8) rising from a carrier 13. The upper jaw is formed on a bar 14 which is pivoted at 15 to the bar 10. The jaws are closed to grip the upper through the manipulation of a handle 16 which is pivoted to a tail 17 on the bar 10 and is connected to the upper jaw 9 by a bar 18. The bar 18 is provided with bends 19 to permit the jaw 9 to yield and thus accommodate itself to varying thicknesses of the upper inserted between the jaws.

The carrier 13 is pinned to a rod 20 rotatably mounted in bearings 21 formed on a support 22 contained in each of the slots 6 and 7. The support 22 normally rests upon a buffer-spring 23 carried in a spring-cage 24 on the top of the machine frame. The support is provided with a foot 25 having a groove 26 formed thereon which hooks under a rail 27 carried by a base 28 bolted to the top of the machine frame. The rail 27 is curved around the toe and is straight along the sides and encloses an area substantially equal to the projected area of the insole on the last. With this construction the support 22 may tip about the point of engagement of the foot 25 and rail 27 to move the grippers longitudinally from a normal inoperative position to a position where they may be closed upon the upper. In addition to their longitudinal movement the grippers may tip vertically about the pivot 11 under the influence of the rising work against the tension of a series of leaf springs 29 carried by the support 22. One of the springs 29 carries a pin 30 which projects between the plates 12 into the path of movement of a tail 31, depending from the bar 10, which engages the pin 30 and tensions the springs 29 when the grippers tip about the pivot 11. The tension of the springs 29 for each gripper is substantially sixty-five pounds but this tension may be varied by a tension device 32 carried by the support 22. The grippers may also turn laterally about the axis of the rod 20, which movement is limited by the pin 30 (Fig. 8), to permit the grippers to automatically adapt themselves to the longitudinal stretching action of the upper.

In order to constrain the critical gripper 3 to move longitudinally into its gripping position in a vertical plane intersecting the notch, the lead line and the lacing slit the support 22 therefor carries a yoke 33 (Fig. 4) arranged to hold the bar 10 from turning about the axis of the rod 20 during the upper-engaging movement of the gripper.

Figures 4, 15:
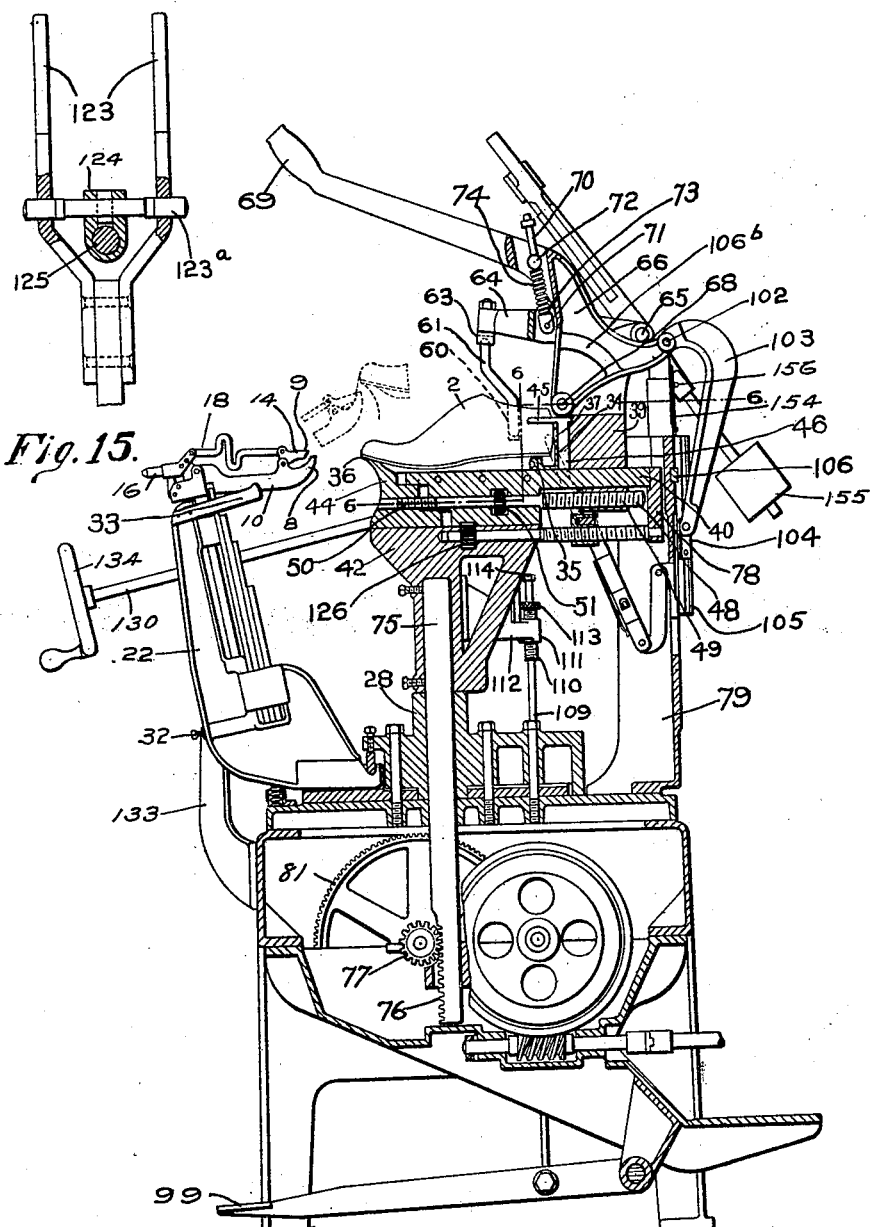
Fig. 4 is a central sectional elevation of the machine showing a last clamped to the work rests which are in their depressed position and the position of the grippers both in a normal inoperative position (full lines) and in an elevated position (dotted lines)
Fig. 15 is a detail in front elevation, partly in section, of the posts for tensioning the binder.

In the illustrated embodiment of the invention the last 2 (Fig. 4) having assembled thereon the insole and upper and parts within it, is placed in the machine with the face of the heel of the last engaged with a back rest 34 and with the insole on the last engaged with a heel seat rest 35 and a forepart rest 36. The back rest 34 is provided with a slot 37 for the reception of an assembling tack 38 (Fig. 12) the head of which usually projects from the face of the heel of the last. The back rest 34 is secured to a slide 39 which is mounted to slide on a guide 40 (Fig. 4). The guide 40 is interposed between, and secured to, a pair of plates 41 (Fig. 3) integral with a carrier 42 (Fig. 4) which normally rests upon the base 28. The heel seat rest 35 is formed integral with the back rest 34 and is mounted to slide upon the top of the guide 40 (Fig. 4). The forepart rest 36 is provided with an indicating mark 43 (Fig. 5) arranged in the center line of the machine. The forepart rest 36 is formed on a slide 44 which is mounted to slide between the plates 41 on the top of the carrier 42 (Fig. 4). To properly position the last laterally as it is moved by the operative against the back rest 34 the slide 39 carries a pair of arms 45 (Figs. 1 and 4) arranged to embrace the face of the heel of the last. One of the arms is carried by a vertical post 46 which is pivotally mounted in the slide 39. The other arm is loosely mounted on the post 46. With this construction the arms may shift laterally to properly center right and left lasts and may separate more or less to accommodate lasts of different sizes. The arms 45 separate under the pressure of the work introduced between them against the tension of a pair of leaf springs 47 (Figs. 1, 2, 3 and 6) carried by the slide 39.

In order that the upper fitting devices of the machine may operate upon all sizes and styles of lasts whether rights or lefts without substitution, change or adjustment thereof the forepart and heel part rests are mounted for adjustment towards and from each other in a differential manner so that the tip-seam line on the last hereinbefore referred to may be uniformly positioned in the vertical plane of the slots 6 of the grippers 4 and 5 irrespective of the size or style of last upon which the upper is positioned. To position singly a plurality of different sizes or styles with the tip-seam line thereon in an invariable position relative to the lasting devices the guide 40 carries a horizontal shaft 48 which is provided at one end with coarse threads 49 and at the other end with fine threads 50. The coarse and fine threads engage respectively with similar threads in the slides 39 and 44. The shaft 48 carries a gear 51 which is driven from a horizontal shaft 52 (Fig. 6) through a gear 53 carried by the shaft 52. The shaft 52 is connected by a universal joint 54 to a shaft 55 which is journaled in a bearing 56 carried by a universal joint 57 (Fig. 1) supported by a bracket 58 on the machine frame. The shaft 55 carries a hand wheel 59 by means of which the operative may slide the heel and forepart rests towards or from each other to properly position the last in the machine. When the last is properly positioned in the machine the face of the heel of the last engages the heel rest 34, the tip-end of the insole on the last is flush with the tip-end of the rest 36, the mark 43 registers with the lead line of the last, and the tip-seam line on the last lies in the vertical plane of the slots 6 of the grippers 4 and 5.

In order to clamp the positioned last to prevent its displacement during the lasting operation the usual spindle socket 60 is engaged by a bent rod 61 (Fig. 4) which binds the last upon its supporting rests. To this end the free end of the rod 61 is engaged by the sloping faces 62 (Figs. 1 and 2) of a block 63 which is secured to a yoke 64 pivoted on a pin 65 carried by the slide 39 (Figs. 2 and 4). The block 63 is actuated to press the rod 61 into binding engagement with the last 2 by a three-armed lever 66 which is mounted in a slot 67 (Fig. 1) formed in the slide 39 and pivoted to a pin 68 carried by the slide. The lever 66 is provided with a handle 69 for engagement by the operative. In order that the clamp may adapt itself to the varying heights of lasts the lever 66 is yieldingly connected to the yoke 64. To this end a rod 70, pivoted at 71 to the yoke 64, is loosely embraced by a block 72 pivoted to the lever 66. Interposed between the block 72 and a shoulder 73 on the rod is a spring 74 coiled around the rod. With this construction manipulation of the handle 69 in one direction tensions the spring 74 which yieldingly presses the rod 61 into binding engagement with the last. It will be noticed from an inspection of Fig. 4 that the pivots 68, 71 and 72 constitute the three pivots of a toggle which when made or straightened locks the clamp in its clamping position. It will also be noticed that the spring 74 interposed between the pivots 71 and 72 provides a yielding arm for the toggle.

After the last with the upper thereon has been properly positioned and clamped in the machine the grippers are engaged with the upper around the forepart and then the last and grippers are relatively actuated to stretch the upper on the last. To relatively actuate the last and grippers the carrier 42 is connected to a vertical rod 75 (Fig. 4) which is provided at its lower end with a rack 76 engaged by a pinion 77 which is driven from a suitable source of power to elevate the last. As the grippers are engaged with the upper at the time the last is elevated the grippers are swung about the pivots 11 against the pressure of the springs 29 thus placing a heavy tension upon the upper which is thereby stretched and drawn to the wood of the last. The carrier 42 during its elevating movement is guided by a vertical guide 78 (Fig. 4), connected to the guide 40, which slides in ways formed in a bracket 79 supported by the top of the machine frame.

Figure 9:
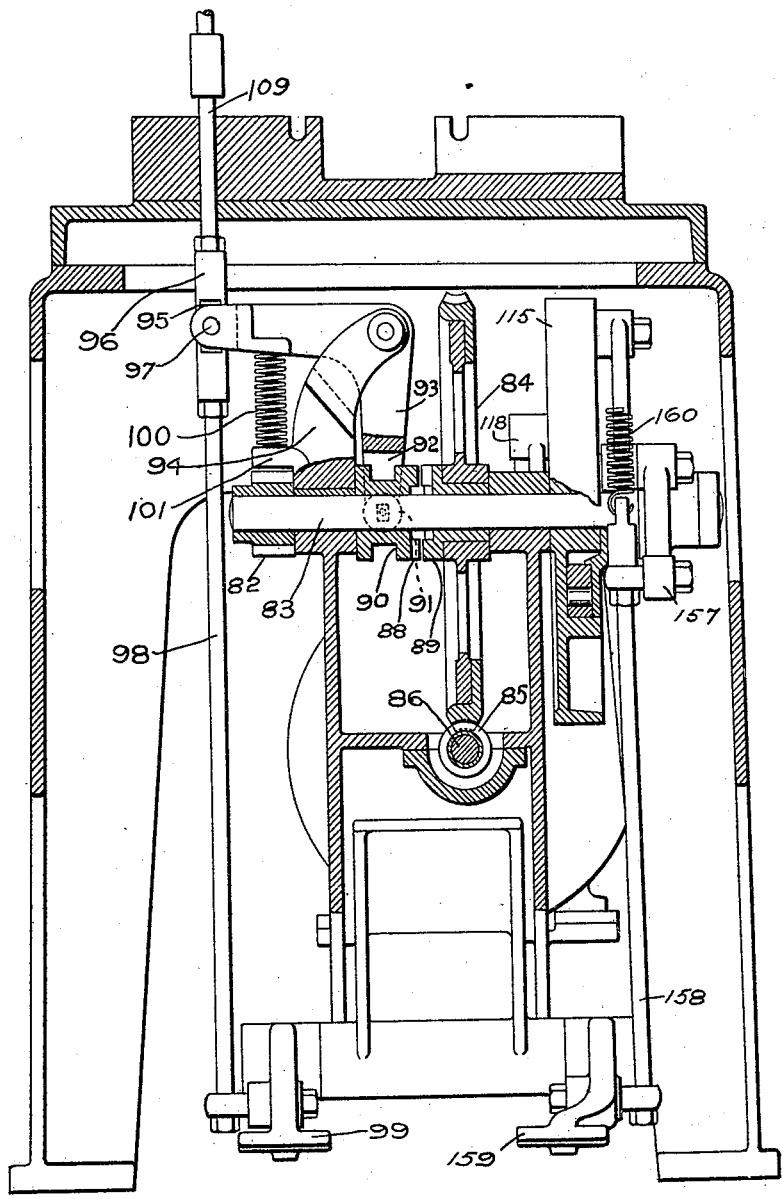
Fig. 9 is a detail, in front elevation, partly in section, of the driving mechanism.
Figure 10:
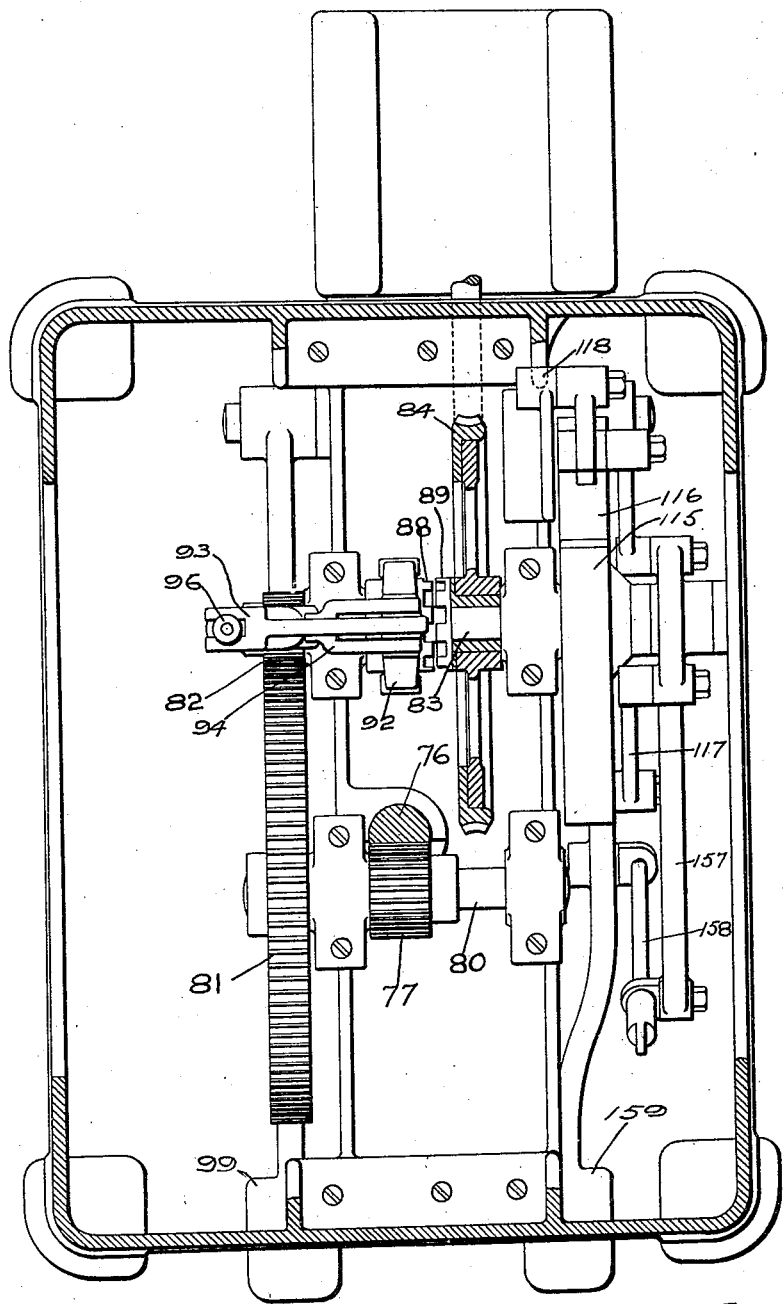
Fig. 10 is a detail in plan, partly in section, of the driving mechanism.

The pinion 77 is mounted on a horizontal shaft 80 (Fig. 10), journaled in the frame of the machine, and carries a gear 81 which meshes with a pinion 82 on a horizontal shaft 83 (Fig. 9) journaled in the frame of the machine. The shaft 83 loosely carries a worm wheel 84 which is driven by a worm 85 (Figs. 4 and 9) on a horizontal shaft 86 journaled in the frame of the machine and driven from some suitable source of power herein shown as an electric motor 87 carried by the machine frame. In order to connect the shaft 83 to the worm wheel 84 the shaft 83 carries a clutch sleeve 88 (Figs. 9 and 10) splined thereto so as to rotate therewith and move longitudinally thereof. To slide the clutch sleeve 88 into engagement with a co-operating clutch member 89 formed on the hub of the worm wheel 84 the clutch sleeve 88 is provided with a peripheral groove 90 (Fig. 9) which embraces a pair of rolls 91 carried by a yoke 92. The yoke 92 is formed on the vertical arm of a bell crank lever 93 which is pivoted on a yoke-bracket 94 carried by the machine frame. The horizontal arm of the bell crank lever is yoked to embrace a flat portion 95 of a cylindrical connector 96 to which the bell crank lever 93 is connected by a pin 97. The connector 96 is carried by a rod 98 which is connected to a treadle 99. With this construction pressure upon the treadle 99 causes the engagement of the clutch members 88 and 89 to throw into operation the driving mechanism for elevating the last. When the pressure upon the treadle is relieved a spring 100 (Fig. 9) interposed between the horizontal arm of the bell crank lever 93 and a lug 101 on the bracket 94 disengages the clutch members 88 and 89 and restores the treadle 99 and its connected parts to their original position.

Figure 1:
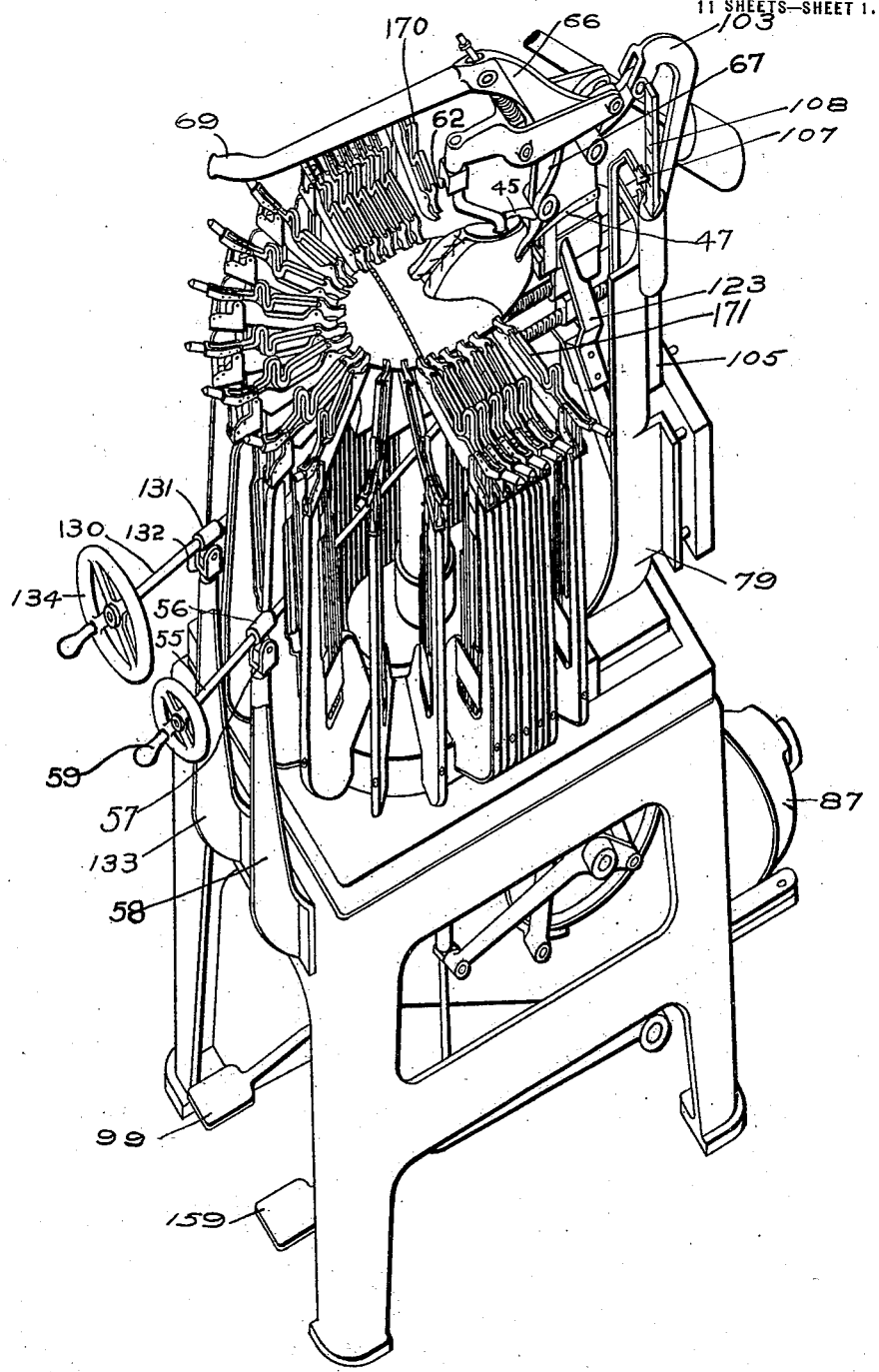
Figure 2:
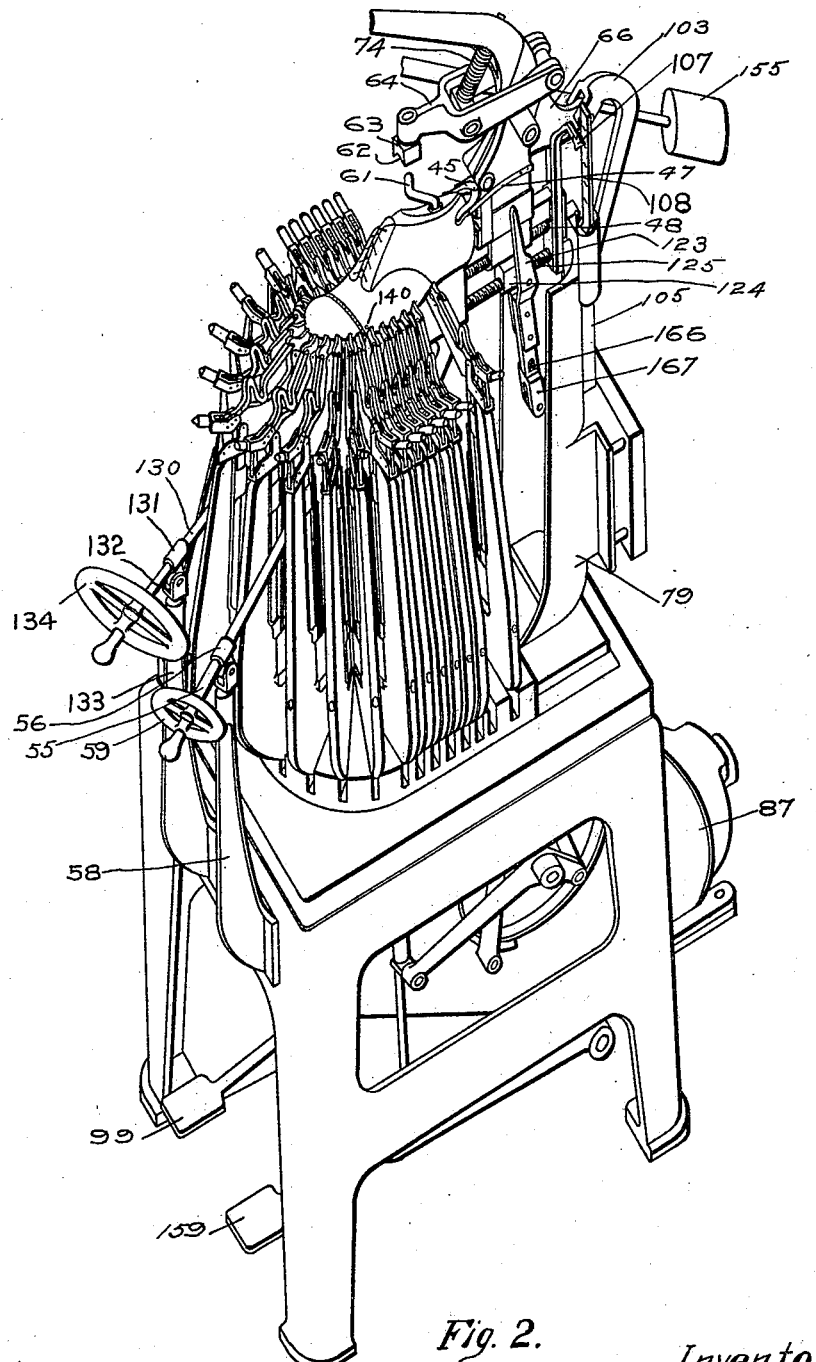
Fig. 2 is a view similar to Figure 1 showing the grippers engaged with the updrawn upper at which time the last is unclamped from the work rests which are in an elevated position.

During the elevation of the last the supports 22 tip about the point of engagement with the rail 27 to bring the grippers from the position of Fig. 1 to the position of Fig. 2. The grippers also tip, about the pivot 11 against the tension of the springs 29, to permit them to follow the rising work, and turn, laterally about the axis of the rod 20, to permit them to automatically adapt themselves to the longitudinal stretch of the upper.

It is desirable to automatically unclamp the last during the elevation thereof in order to prepare for the ready removal of the work from the machine. To this end the lever 66 (Fig. 4) is pivoted at 102 to an arm 103 which in turn is pivoted to a block 104 mounted to slide in ways 105 carried by the bracket 79. Interposed in the path of movement of the block 104 is a slide 106 which interrupts the movement of the block 104 responsive to the elevating movement of the last thus causing the lever 66 to turn about its pivot 102 and thereby break the toggle to free the rod 61. The return of the toggle to its broken position is retarded by friction blocks 106$^a$ (Figs. 3 and 5) arranged on opposite sides of the guide 39 in position to engage friction surfaces 106$^b$ (Fig. 4) on the lever 66. The slide 106 is adjustably mounted to move into and out of the path of the block 104 so that the automatic unclamping of the last may or may not take place at the will of the operative.

It will be apparent to those skilled in the art that the pressure on the upper increases during the continued elevation of the last. As the pressure required to coincide the tip-seam of the upper with the tip-seam on the last varies with the size or quality of the upper it will also be apparent that it is necessary for the operative to vary the height of elevation of the last in accordance with the requirements of the particular upper being operated upon. A skilled operative through observation of the action of the upper under the influence of the grippers can readily determine the point in the elevation of the last at which the last should be stopped to avoid injury or excessive stretching of the upper. It will be necessary, however, for the benefit of an unskilled operative, to provide on the instruction card travelling with the shoe instructions accurately defining the point at which the last should be stopped. To visually indicate the point referred to in the instruction card at which the operative should stop the last to avoid injury or excessive stretching of the upper the guide 78 carries a pointer 107 (Fig. 2), arranged to travel over a scale 108, on the bracket 79, which is provided with a series of marks indicating the limit of stretch of various kinds or sizes of uppers. With this construction and mode of operation the operative observes the instructions on the instruction card travelling with the shoe and releases the treadle 99 when the pointer reaches the mark on the scale referred to on the instruction card.

In order to provide an automatic stop for stopping the last at any predetermined point in its elevation for use when the machine is operating upon a large quantity of uppers having the same limit of stretch the connector 96 (Fig. 9) carries a rod 109 (Figs. 4 and 9) which passes loosely through a sleeve 110 carried by a lug 111 formed on a bracket 112 carried by the carrier 42. The sleeve 110 is provided with exterior threads which engage interior threads on the lug 111. The sleeve 110, above the lug 111, is also provided with a thumb-nut 113 which is arranged to slide on the rod 109 during the elevation of the last and engage a nut 114 on the upper end of the rod. When the thumb-nut 113 engages the nut 114 the treadle rod is elevated against the pressure of the foot thus disengaging the clutch and throwing out the driving mechanism. By rotating the thumb-nut 113 it may be advanced or retracted on the lug 111 thus varying the point in the elevation of the last at which it will engage the nut 114 to disengage the clutch in accordance with the variations in the lasting requirements of the various uppers.

Figure 11:
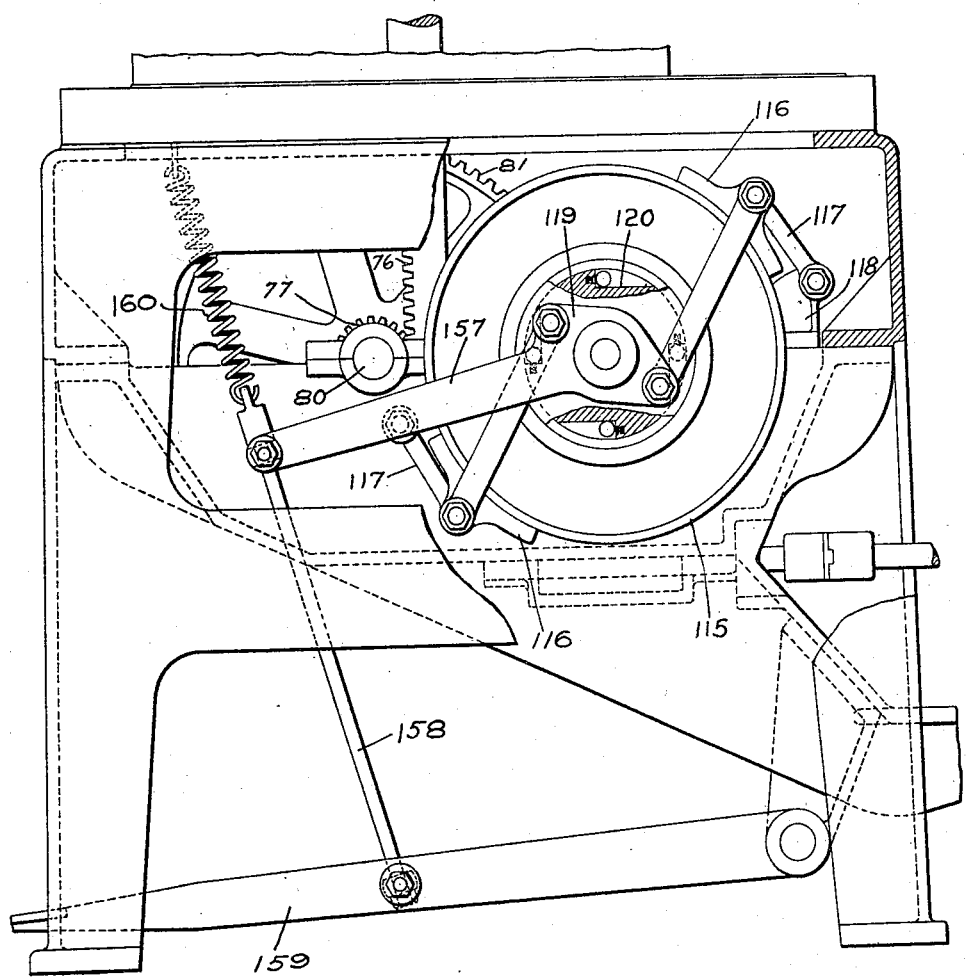
Fig. 11 is a detail in side elevation, partly in section, of the brake mechanism.

As the upper is being pulled upon by over a thousand pounds at the time the driving mechanism for elevating the last is thrown out of operation it is necessary to provide some means for holding the last in its elevated position until the operation of securing the lasted upper to the insole is completed, otherwise the shaft 83 would rotate in a direction to return the last to its original depressed position under the influence of gravity and the combined tension of the springs 29. To this end the shaft 83 loosely carries a brake-drum 115 (Figs. 9, 10 and 11) which is normally engaged by a pair of shoes 116. Each of the shoes 116 is connected to an arm 117 which is pivoted on a bracket 118 on the machine frame. The arms 117 are connected to a plate 119 which is pivoted on the shaft 83. The shaft 83 carries a roll carrier 120 similar to the roll carrier of a Horton clutch which permits the shaft 83 to turn independently of the brake-drum 115 during the elevation of the last. As soon, however, as the shaft 83 is unclutched from the source of power and commences to rotate in the opposite direction under the pull of the grippers the rolls in the carrier 120 bind the shaft 83 to the drum 115 thereby holding the last in its elevated position. With this construction the brake is automatically thrown into operation when the drive for elevating the last is thrown out of operation.

From the foregoing description it will be apparent that the parts are now in the position of Fig. 2 which shows the unclamped last elevated with the upper properly stretched and drawn to the wood of the last.

In order that the upper may be bound in its lasted position a leather binder 121 (Figs. 3, 12, 13 and 14) provided with loops 122 at its ends is placed by the operative in position around the forepart of the last to press the upper against the edge face of the insole. The loops 122 are inserted upon posts 123 which are pivoted on the opposite ends of an equalizing lever 123$^a$ (Fig. 15) which is centrally pivoted on a block 124 mounted to travel on a threaded rod 125 which is journaled in the carrier 42 and guide 78 (Fig. 4). The loops are placed on the posts 123 when they occupy the dotted line position of Fig. 3 and are then moved into the full line position of Fig. 3 to tighten the binder about the upper and thus hold the upper tightly pressed against the edge of the insole. To this end the rod 125 carries a gear 126 (Fig. 4) which meshes with a gear 127 (Fig. 6) mounted on a horizontal shaft 128 journaled on the carrier 42. The shaft 128 is connected by a universal joint 129 to a shaft 130 which is journaled in a bearing 131 carried by a universal joint 132 (Figs. 1 and 2) supported by a bracket 133 on the machine frame. The shaft 128 is provided with a hand wheel 134 by means of which the operative may manipulate the posts 123 to tension the binder around the upper and thus press it against the edge of the insole. As the binder is tensioned on the upper in the manner described the equalizing lever 123$^a$ turns on the block 124 to equalize the strain on the binder and prevent the binder from moving longitudinally on the upper which would have a tendency to displace the upper from its proper lasted position.

In order that the binder may be clamped in its tensioned position the operative positions a clamp 135 (Figs. 3, 12, 13 and 14) loosely about the binder and then closes the clamp upon the binder. The clamp 135 comprises a horizontal bar 136 (Fig. 14) which loosely supports a pair of depending posts 137 and 138 which are prevented from sliding off the ends of the bar 136 by pins 139. As shown by the dotted lines in Fig. 14 (illustrating the contacting surfaces of the bar and posts) while the posts are free to slide upon the bar 136 when they occupy a position normal to the bar they may be cramped upon the bar by tilting them out of a normal position. The posts are arranged upon opposite sides of the shoe and are each provided with a horn 139$^a$ which enters a hole 140 (Figs. 13 and 14) formed in the upper below the insole and engages the exposed face of the insole, a curved spring metal jaw 141 arranged to engage a curved hump 142 (Fig. 13) on the binder, and a foot 143 arranged to engage the top of the hump 142. When the clamp has been engaged with the binder and insole in the manner described the post 137 (Fig. 14) is slid along the bar 136 to tighten the clamp on the binder. During the initial movement of the post 137 on the bar 136 the binder is firmly pressed against the post 138 (Fig. 14) until it becomes cramped on the bar 136 in the manner shown in Fig. 14. Then the continued sliding movement of the post 137 presses the jaw thereon firmly against the binder after which the upper part of the post moves independently of the lower part thus cramping the post 137 on the bar 136.

To close the clamp in the manner described the machine carries a cramper 144 (Figs. 5 and 14) comprising a jaw 145 rigidly secured to an arm 146 (Fig. 5) and a jaw 147 pivoted at 148 to the arm 146. The jaws 145 and 147 are connected by a toggle 149 which is made and broken to open and close the jaws by a handle 150 connected to one leg of the toggle. To close the clamp 135 on the binder the jaws 145 and 147 are inserted between a shoulder 151, on the bar 136, and the post 137 (Fig. 14). The operative then manipulates the handle 150 to open the jaws and forcibly slide the post 137 engaged by the jaw 146 along the bar 136 to clamp the binder in its tensioned position and cramp the posts 137 and 138 on the bar. In order to permit the movement of the cramper into and out of operative position the arm 146 is pivoted to swing vertically on a rectangular block 152 which is mounted to turn horizontally on a pin 153 carried by the bracket 79. To hold the cramper in a central elevated position away from the work the back of the block 152 is engaged by a flat spring 154 (Figs. 3 and 4) carried by the bracket 79 which normally maintains the block 152 in a central horizontal position and the arm 146 is provided with a weight 155 which holds the arm in a central vertical position through the engagement of a pin 156 (Fig. 5) on the arm 146 with the back of the spring 154.

The last with the upper fitted thereon is now ready to be returned to its original position. This may be accomplished by merely releasing the brake 115 to permit the shaft 83 to rotate under the influence of gravity and the pull of the grippers. To this end the plate 119 is connected by an arm 157 (Fig. 11) to a treadle rod 158 connected to a treadle 159. The treadle is maintained elevated and the shoes 116 are held in engagement with the brake 115 by a coiled spring 160 one end of which is connected to the machine frame and the other end of which is connected to the treadle rod 158. With this construction pressure on the treadle 159 tips the arms 117 about their pivotal connection with the brackets 118 and thus releases the shoes from the brake-drum 115 thereby permitting the shaft 83 and drum 115 to revolve together, under the influence of the weight of the parts carried by the carrier 42 and the pressure of the tensioned springs 29 of the grippers, and thus return the last to its depressed position.

In order to automatically open the grippers during the descent of the last the carrier 13 (Fig. 7) carries a pivoted latch 161 which is normally pressed by a leaf spring 162, carried by the carrier 13, against a pin 163 connected to the plates 12. When the grippers are engaged with the upper and elevated by the last into the dotted line position of Fig. 7 a pin 164 carried by the handle 16 slips beneath the head of the latch. Then when the grippers are lowered under the influence of the descending last the latch 161 hooks over the pin 164 thus causing the jaws 8 and 9 to turn about two different pivots, namely, the pivots 11 and 17, respectively. This differential turning of the jaws 8 and 9 during the descent of the last automatically opens the jaws thereby disengaging the upper. When the upper is released the grippers supports drop back to their original inoperative position. The shock of the return of each support is absorbed by the spring 23.

In order to automatically release the tension on the loops of the binder during the descent of the last to permit the free removal of the fitted upper from the machine the posts 123 (Figs. 3 and 15) are connected to an arm 165 which is mounted to turn on a pin 166 (Figs. 3 and 4) carried by a short link 167. The link 167 is pivoted on an arm 168 which is pivoted on a lug 169 carried by the bracket 79. With this construction the posts 123 are automatically tipped from the full line position of Fig. 3 into the position of Fig. 4 as the last descends to its original position. This permits the operative to withdraw the loops of the binder from the posts 123 without manipulation of the hand wheel 134. In order to maintain the equalizing lever 123ª in a central idle position the arm 165 carries a leaf spring 170ª which is arranged to engage the rectangular back of the link 167.

It is a fact that the ankle bone of the foot is arranged somewhat lower on the outside of the foot than on the inside. Consequently the upper of a low shoe should not extend as high on the outside of the shoe as on the inside. In order to pull that portion of the upper of a low shoe differentially so that it will be positioned substantially at equal distances from the ankle bone on the outside and inside of the foot the machine of the drawings is provided with an extra pair of grippers 170 and 171 (Figs. 1 and 2) arranged on opposite sides of the machine. The gripper 170 is engaged with the upper of a right low shoe and the gripper 171 is engaged with the upper of a left low shoe. With this construction the upper may be positioned the proper distance from the ankle bone on both sides of the shoe.

When no work is in the machine the carrier 42 for the work rests is in its depressed position, the grippers are open, and the grippers supports are withdrawn into an inoperative position. To insert the work the operative places the heel seat of the insole on the last upon the rest 35 (Fig. 4) and pushes the last backwardly between the arms 45 which open against the pressure of the work to center the work and permit the face of the heel of the last to engage the back rest 34. The operative, while continuing to hold the work against the back rest 34, manipulates the hand wheel 59 until the tip-end of the rest 36 is flush with the tip-end of the insole on the last and the mark 43 registers with the lead line on the last. The operative then inserts the rod 61 into the spindle socket 60 and manipulates the handle 69 to bind the last firmly in its adjusted position on the work rests.

The operative then holds the notch on the toe of the upper against the lead line on the last and manually closes the grippers 3 on the notched portion of the upper. The grippers 4 and 5 are then closed upon the ends of the tip-seam of the upper. After the critical grippers 3, 4 and 5 are closed upon the upper the other grippers are brought into operative position and closed upon the upper in any orderly manner found desirable or expedient.

The operative then steps upon the treadle 99 thereby throwing in the driving mechanism for elevating the last. During the elevation of the last the grippers stretch the upper and cause the stretched upper to conform to the lines of the last in the manner predetermined by the pattern drafter. Before the last reaches its limit of elevation the rod 61 is released which, however, does not release the last as at that time the upper is held under tension by the grippers.

When the upper is properly stretched the driving mechanism is thrown out of operation either automatically by the engagement of the nuts 113 and 114 (Fig. 4) or manually by the release of the treadle at the judgment of the operative or through the instructions of the scale 108.

The operative then positions the binder 121 around the forepart of the upper and tensions the binder to press the upper against the edge face of the insole. The binder is then clamped in its tensioned position by a clamp which is first positioned loosely about the binder and is then actuated to close upon the binder by a cramper 144 carried by the machine.

After the upper has been bound and clamped to the edge face of the insole the work is returned to its depressed position. During the return of the work the grippers aer automatically opened and the posts 123, which hold the binder in its tensioned position, are tipped forwardly to release the binder. The operative then may readily remove the lasted shoe from the machine.

It will be readily understood by those skilled in the art that the descriptive terms "over the last," "pulling-over" and "overdraw" etc., are not applicable to the illustrated embodiment of the invention since these descriptive terms are based upon a construction or mode of operation wherein the upper is drawn over upon the bottom of the insole.

It will also be clear to those skilled in this class of machines and with the general objects of the present invention in view, that changes may be made in the details of structure, the described and illustrated embodiment thereof being intended as an exploitation of its underlying essentials the features whereof are definitely stated in their true scope in the claims herewith.

What is claimed as new, is:—

1. A shoe machine, having, in combination, a critical gripper arranged to engage the tip-end of the upper and constrained to operate in a fixed path, and a pair of floating grippers arranged on opposite sides of the shoe in position to engage the ends of the tip-seam, substantially as described.

2. A shoe machine, having, in combination, a frame having a plurality of slots therein, a critical gripper arranged to operate in a vertical plane, and a pair of floating critical grippers mounted to operate in the slots in the frame, arranged in a second vertical plane perpendicular to the first plane, substantially as described.

3. A shoe machine, having, in combination, a frame having a plurality of slots therein, a critical gripper arranged to operate in a vertical plane, a pair of floating critical grippers mounted to operate in the slots in the frame, arranged in a second vertical plane perpendicular to the first plane, and means for supporting singly a plurality of lasts of different sizes with the tip-lines thereon lying in the second plane, substantially as described.

4. A shoe machine, having, in combination, a frame having a plurality of slots therein, a pair of grippers arranged upon opposite sides of a shoe and mounted to operate in the slots in the frame, arranged in a vertical plane extending transversely of the shoe, and a group of grippers arranged about the toe of the shoe and mounted to operate in the slots in the frame, radiating from a common center located in said plane, substantially as described.

5. A shoe machine, having, in combination, a frame having a plurality of slots therein, a critical gripper arranged to engage the upper at the tip end of the toe and constrained to operate in a vertical plane, a pair of critical grippers mounted to operate in the slots in the frame, arranged in a vertical plane perpendicular to the first plane, and means permitting the pair of critical grippers to be moved manually out of the second vertical plane to initially engage the ends of the tip-seam on the upper and to be moved automatically back into the second plane to cause the tip-seam of the upper to coincide with the tip-line on the last, substantially as described.

6. A shoe machine, having, in combination, a frame having a plurality of vertical slots formed therein, a pair of critical grippers mounted to operate in the slots in said frame arranged in a vertical plane extending transversely of the shoe, and means for supporting anyone of a plurality of lasts of different sizes, with the tip-lines thereon lying in said vertical plane, substantially as described.

7. A machine for stretching an upper to the upper shaping surface of a last, having, in combination, means for supporting a last with the lead-line of the last and the notch and lacing slit of the upper on said last lying in a vertical plane passing through the center line of said support, and a critical gripper mounted to engage the upper surrounding said notch and constrained to operate in said vertical plane, substantially as described.

8. A machine for updrawing uppers on lasts having insoles thereon, having, in combination, means for updrawing the upper, and means for tensioning a continuous binder about the forepart of the shoe to bind the updrawn upper in updrawn position to the edge face of the insole, substantially as described.

9. A machine for updrawing uppers on lasts having insoles thereon, having, in combination, means for updrawing the upper, and means for tensioning a continuous binder about the forepart of the shoe to bind the updrawn upper to the edge face of the insole, substantially as described.

10. A machine for updrawing uppers on lasts having insoles thereon, having, in combination, means for causing the marginal portion of an upper adjacent the insole to stand substantially in the vertical plane of the edge face thereof, and means for tensioning a continuous binder about the forepart of the shoe to bind the upper in that position, substantially as described.

11. A machine for updrawing uppers on lasts having insoles thereon, having, in combination, means for stretching the upper, and means for tensioning a continuous binder about the forepart of the shoe to bind the stretched upper to the edge face of the insole, substantially as described.

12. A machine for updrawing uppers on lasts having insoles thereon, having, in combination, means for stretching the upper on the top of the last, and means for tensioning a continuous binder about the forepart of the shoe to bind the stretched upper to the edge face of the insole on the bottom of the last, substantially as described.

13. A machine for updrawing uppers on lasts having insoles thereon, having, in combination, means for stretching a portion of the upper on the top of the last, and means for tensioning a continuous binder about the forepart of the shoe to bind the stretched portion of upper to the edge face of an insole on the bottom of the last, substantially as described.

14. A machine for updrawing uppers on lasts having insoles thereon, having, in combination, means for stretching an upper on the top of a last at a plurality of separated points, and means for tensioning a continuous binder about the forepart of the shoe to bind the stretched upper to the edge face of an insole on the bottom of the last, substantially as described.

15. A machine for updrawing uppers on lasts having insoles thereon, having, in combination, means for stretching the upper on a last, and means for binding the stretched upper to the edge face only of an insole on the last, substantially as described.

16. A machine for updrawing uppers on lasts having insoles thereon, having, in combination, means for stretching the upper, means for binding the stretched upper to the edge face only of the insole, and means for clamping the bound upper, substantially as described.

17. A machine for updrawing uppers on lasts having insoles thereon, having, in combination, a support for an assembled shoe, a plurality of grippers arranged to engage the upper at separated points, means for relatively actuating the support and grippers to updraw the upper, and means for binding the updrawn upper in its updrawn position to the edge face only of the insole, substantially as described.

18. An updraw machine, having, in combination, a support for an assembled shoe, a plurality of grippers arranged to engage the upper of the shoe, driving mechanism for elevating the support against the pull of the grippers, a treadle for throwing the driving mechanism into operation, automatic mechanism for throwing the driving mechanism out of operation, and means for varying the point in the elevation of the last at which the automatic mechanism operates to throw out the driving mechanism, substantially as described.

19. An updraw machine, having, in combination, a support for an assembled shoe, a plurality of grippers arranged to engage the upper, a rack connected to the support, a pinion meshing with the rack, normally inoperative power-driven mechanism for rotating the pinion to elevate the support against the pull of the grippers, a treadle for throwing the power-driven mechanism into operation, and automatic mechanism, operating against the pressure on the treadle for throwing the power-driven mechanism out of operation, substantially as described.

20. An updraw machine, having, in combination, a support for an assembled shoe, a plurality of grippers arranged to engage the upper, driving mechanism for elevating the support against the pull of the grippers, a treadle for throwing the driving mechanism into operation, a stationary scale, and a pointer carried by the support arranged to travel, during the elevation of the support, over the scale and indicate to the operative the proper time to release the treadle to throw the driving mechanism out of operation, substantially as described.

21. An updraw machine, having, in combination, a support for an assembled shoe, a plurality of grippers arranged to engage the upper of the shoe, driving mechanism for elevating the support against the pull of the grippers, a clutch for connecting the driving mechanism to the source of power, a treadle for operating the clutch to start the driving mechanism, a rod connected thereto, and automatic mechanism for operating the clutch to disconnect the driving mechanism comprising a nut on the treadle rod, and an adjustable device carried by the support, substantially as described.

22. An updraw machine, having, in combination, lasting devices, and a support for an assembled shoe comprising a back rest for engaging the face of the heel end of the shoe, a heel seat rest arranged to engage the heel seat of the insole, and a forepart rest arranged to engage the tip end of the insole, and means for centering the shoe in the machine comprising a pair of arms arranged to embrace the counter of the shoe and an indicating mark on the forepart rest arranged in the center line of the machine which registers with the lead line on the last, substantially as described.

23. An updraw machine, having, in combination, lasting devices, a support for an assembled shoe comprising a pair of bottom rests arranged to engage respectively the heel seat and tip-end of the insole, and means for differentially adjusting the rests comprising a rod provided with fine and coarse threads which engage similar threads on the tip-end and heel seat rests respectively, substantially as described.

24. A machine for updrawing uppers on lasts having insoles thereon, having, in combination, a support for the last, a group of grippers arranged about the forepart of the last, and means for tipping the grippers individually about axes located substantially in the projected edge of the insole on a plane beneath the support, substantially as described.

25. A machine for updrawing uppers on lasts having insoles thereon, having, in combination, a support for the last, and grippers mounted to tip about an axis located substantially at the projection of a point on the edge of the insole on a plane beneath the support, substantially as described.

26. A machine for updrawing uppers on lasts having insoles thereon, having, in combination, a support for the last, grippers mounted to tip about an axis located substantially at the projection of a point on the edge of the insole on a plane beneath the support and turn in a plane substantially parallel to the plane of the last support, substantially as described.

27. A machine for updrawing uppers on lasts having insoles thereon, having, in combination, a support for the last, and grippers mounted to tip about an axis located substantially at the projection of a point on the edge of the insole on a plane beneath the support, turn in a plane substantially parallel to the plane of the last support, and tip about a second axis located above the first axis, substantially as described.

28. A shoe machine, having, in combination, a carrier, a gripper jaw pivoted near its rear end to the carrier, a second gripper jaw pivoted near its front end to the first gripper jaw, and a handle for closing the jaws pivoted to the first gripper jaw in the rear of the pivotal connection between the carrier and the first jaw, substantially as described.

29. A shoe machine, having, in combination, a carrier, a gripper jaw pivoted near its rear end to the carrier, a second gripper jaw pivoted near its front end to the first gripper jaw, a handle for closing the jaws pivoted to the first gripper jaw in the rear of the pivotal connection between the carrier and the first jaws, and means for tipping the jaw about one of these pivots during the ascent of the jaws, substantially as described.

30. A shoe machine, having, in combination, a carrier, a gripper jaw pivoted near its rear end to the carrier, a second gripper jaw pivoted near its front end to the first gripper jaw, a handle for closing the jaws pivoted to the first gripper jaw in the rear of the pivotal connection between the carrier and the first jaw, means for tipping the jaws about one of these pivots during the ascent of the jaws, and means for tipping one of the jaws about a different pivot during the descent of the jaws, substantially as described.

31. A shoe machine, having, in combination, a gripper, means for closing the gripper upon the upper, means for actuating the closed gripper from an initial upper-engaging position to a final position to updraw the upper, means for returning the closed gripper to its initial position, and means for opening the gripper during its return to initial position, substantially as described.

32. A shoe machine, having, in combination, a gripper, means for closing the gripper upon the upper, means for actuating the closed gripper from an initial upper-engaging position to a final position to updraw the upper, means for varying the final position of the gripper in accordance with variations in the grades of uppers engaged thereby, means for returning the closed gripper to its initial position, and means for opening the gripper during its return to initial position, substantially as described.

33. A shoe machine, having, in combination, a plurality of grippers, means for closing the grippers upon the upper, means for actuating the closed grippers through variable distances from an initial upper-engaging position to a final position to updraw the upper, means for returning the closed grippers to their initial position, and means for opening the grippers at a fixed point in their return, substantially as described.

34. A shoe machine, having, in combination, means for pulling upon the opposite ends of a binder extending about the forward portion of a shoe to bind the upper in updrawn position against the edge face of the insole, and means for fastening the binder, substantially as described.

35. A shoe machine, having, in combination, posts arranged to engage the opposite ends of a binder extending about the forward portion of a shoe, and means for actuating the posts to pull upon the binder to bind the upper in updrawn position against the edge face of the insole, substantially as described.

36. A shoe machine, having, in combination, posts arranged to engage the opposite ends of a binder extending about the forward portion of a shoe, means for actuating the posts to pull upon the binder to bind the upper in updrawn position, and a clamp for clamping the bound upper, substantially as described.

37. A shoe machine, having, in combination, a vertically movable shoe support, means for updrawing the upper, posts movable with the shoe support arranged to engage the opposite ends of a binder extending about the forward portion of the shoe, and means for actuating the posts when the support is elevated from a position where they loosely engage the binder to a position where they pull the binder to bind the upper in updrawn position, substantially as described.

38. A shoe machine, having, in combination, a vertically movable shoe support, means for updrawing the upper, posts movable with the shoe support arranged to engage the opposite ends of a binder extending about the forward portion of the shoe, means for actuating the posts when the support is elevated from a position where they loosely engage the binder to a position where they pull the binder to bind the upper in updrawn position, and means for automatically tipping the posts during the descent of the support to release the binder, substantially as described.

39. A shoe machine, having, in combination, means for pulling upon the opposite ends of a binder extending about the forward portion of a shoe to bind the upper in updrawn position, and means for closing a clamp upon the binder, substantially as described.

40. A machine for fitting uppers to lasts having insoles thereon, having, in combination, a shoe rest, a plurality of grippers arranged to engage the forepart of the upper, means for elevating the rest against the pull of the grippers to updraw the upper, and means for pulling upon the opposite ends of a binder extending about the forward portion of the shoe to bind the updrawn upper against the edge face of the insole, substantially as described.

41. A machine for fitting uppers to lasts having insoles thereon, having, in combination, a shoe rest, a plurality of grippers arranged to engage the forepart of the upper, means for elevating the rest against the pull of the grippers to updraw the upper, means for pulling upon the opposite ends of a binder extending about the forward portion of the shoe to bind the updrawn upper against the edge face of the insole, and means for fastening the binder to the shoe, substantially as described.

42. A machine for fitting uppers to lasts having insoles thereon, having, in combination, a shoe rest, a plurality of grippers arranged to engage the forepart of the upper, means for elevating the rest against the pull of the grippers to updraw the upper, means for pulling upon the opposite ends of a binder extending about the forward portion of the shoe to bind the updrawn upper against the edge face of the insole, and a clamp for clamping the binder to the shoe, substantially as described.

43. A machine for fitting uppers to lasts having insoles thereon, having, in combination, a shoe rest, a plurality of grippers arranged to engage the forepart of the upper, means for elevating the rest against the pull of the grippers to updraw the upper, a pair of posts arranged to engage the opposite ends of a binder extending about the forward portion of the shoe, a carrier therefor, an actuating shaft for the carrier, and a hand wheel located at the front of the machine in convenient position for the operative to operate the posts and bind the updrawn upper to the edge face of the insole, substantially as described.

44. A shoe machine, having, in combination, a vertically movable shoe support, means for updrawing the upper, posts movable with the shoe support arranged to engage the opposite ends of a binder extending about the forward portion of the shoe, an actuator therefor, an equalizing lever connecting the actuator and posts for equalizing the pull on the binder, a support for the posts, and a link pivoted at one end to the support and at the other end to a stationary part of the machine, substantially as described.

45. A shoe machine, having, in combination, a shoe support, a plurality of grippers engaged with the upper, means for elevating the support against the pull of the grippers to updraw the upper, means for stopping the elevation of the support, and means for holding the support elevated, substantially as described.

46. A machine for updrawing uppers on lasts having insoles thereon, having, in combination, means for updrawing the upper, and means for pulling upon the opposite ends of a binder extending about the forward portion of the shoe to bind the upper in updrawn position against the edge face of the insole, substantially as described.

47. A machine for updrawing uppers on lasts having insoles thereon, having, in combination, means for updrawing the upper, means for pulling upon the opposite ends of a binder extending about the forward portion of the shoe to bind the upper in updrawn position against the edge face of the insole, and means for fastening the binder, substantially as described.

48. A shoe machine, having, in combination, posts arranged to engage the opposite ends of a binder extending about the forward portion of a shoe, means for actuating the posts to pull upon the binder to bind the upper in updrawn position, and an equalizing device arranged to equalize the pull of the posts on the binder, substantially as described.

49. A shoe machine, having, in combination, posts arranged to engage the opposite ends of a binder extending about the forward portion of a shoe, an actuator therefor, and an equalizing lever connected at its ends to the posts and pivoted at its center to the actuator, substantially as described.

50. A shoe machine, having, in combination, posts arranged to engage the opposite ends of a binder extending about the forward portion of a shoe, an actuator therefor, an equalizing lever connected at its ends to the posts and pivoted at its center to the actuator, and means for obtaining a pivotal movement of the equalizing lever on the actuator, substantially as described.

51. A shoe machine, having, in combination, posts arranged to engage the opposite ends of a binder extending about the forward portion of a shoe, an actuator therefor, an equalizing lever connected at its ends to the posts and pivoted at its center to the actuator, means for obtaining a pivotal movement of the equalizing lever on the actuator, and means for holding the equalizing lever in a central position, substantially as described.

52. A shoe machine, having, in combination, a critical gripper arranged to engage the tip-end of the upper and constrained to operate in a fixed path, a pair of floating grippers arranged on opposite sides of the shoe in position to engage the ends of the tip-seam, and supports for the floating grippers constrained to operate in a plane perpendicular to the plane of the fixed path, substantially as described.

53. A shoe machine, having, in combination, a slotted frame, a critical gripper arranged to engage the upper at the tip-end of the toe and constrained to operate in a vertical plane, a pair of critical grippers mounted to operate in slots in the frame, arranged in a vertical plane perpendicular to the first plane, and means permitting the pair of critical grippers to move out of the second vertical plane to initially engage the ends of the tip-seam on the upper and back into the second plane to cause the tip-seam of the upper to coincide with the tip-line on the last, substantially as described.

54. A shoe machine, having, in combination, a pair of critical grippers arranged on opposite sides of the shoe, supports for the grippers constrained to operate in a vertical plane extending transversely of the shoe, and means for supporting singly a plurality of lasts of different sizes with the tip-lines thereon lying in the vertical plane, substantially as described.

55. An upper fitting machine, having, in combination, means for updrawing the upper, a pair of devices arranged to engage the opposite ends of a binder extending about the forward portion of the shoe, means for actuating the devices to tension the binder on the shoe, and mechanism connecting the actuating means and the devices for equalizing the pull on the binder, substantially as described.

56. An upper fitting machine, having, in combination, a vertically movable shoe support, means for updrawing the upper, a pair of devices movable with the shoe support arranged to engage the opposite ends of a binder extending about the forward portion of the shoe, means for actuating the devices to tension the binder on the shoe, and mechanism connecting the actuating means and the devices for equalizing the pull on the binder, substantially as described.

57. A machine for updrawing the upper of a low shoe, having, in combination, a rest for the shoe, and automatic means for differentially stretching the opposite sides of the upper which will be adjacent the ankle bone when in use to position the upper a uniform distance from the ankle bone on both sides of the shoe, substantially as described.

58. A machine for updrawing uppers, having, in combination, a critical gripper mounted to operate in a vertical plane and arranged to engage the tip end of the upper, a pair of opposed critical grippers arranged to engage the ends of the tip-seam, supports for the pair of critical grippers mounted to operate in a vertical plane perpendicular to the first plane, and means for supporting singly a plurality of lasts of different sizes with the tip-lines thereon lying in the second plane, substantially as described.

59. A shoe machine, having, in combination, a shoe support, a clamp arranged to embrace the opposite sides of a shoe, and means for closing the clamp upon the shoe comprising a cramper provided with a pair of jaws pivoted together for opening and closing movement, substantially as described.

60. A shoe machine, having, in combination, a shoe support, a clamp arranged to embrace the opposite sides of a shoe, means for closing the clamp upon the shoe comprising a cramper provided with a pair of jaws pivoted for opening and closing movement, and a handle pivoted to one jaw and connected by a toggle to the other jaw for opening and closing the jaws, substantially as described.

61. A cramper for use in lasting or fitting the uppers of shoes comprising a pair of jaws pivoted together for opening and closing movement mounted to move freely about a vertical axis, substantially as described.

62. A cramper for use in lasting or fitting the uppers of shoes comprising a pair of jaws pivoted together for opening and closing movement mounted to move freely about a horizontal axis, substantially as described.

63. A cramper for use in lasting or fitting the uppers of shoes comprising a pair of jaws pivoted together for opening and closing movement mounted to move freely about vertical and horizontal axes, substantially as described.

64. A cramper for use in lasting or fitting the uppers of shoes comprising a pair of jaws pivoted together for opening and closing movement mounted to move freely about axes arranged in two planes, substantially as described.

65. A cramper for use in lasting or fitting the uppers of shoes comprising a pair of jaws pivoted together for opening and closing movement mounted to move freely about axes arranged in two planes, and means for maintaining the jaws normally in an inoperative position, substantially as described.

66. A cramper for use in lasting or fitting the uppers of shoes comprising a pair of jaws pivoted for opening and closing movement mounted to move freely about axes arranged in two planes, and means for maintaining the jaws normally elevated in a central position, substantially as described.

67. A cramper for use in lasting or fitting the uppers of shoes comprising a pair of jaws pivoted for opening and closing movement mounted to move freely about axes arranged in two planes, and means for maintaining the jaws normally elevated in a central position comprising a leaf spring and a pin co-operating therewith, substantially as described.

68. A lasting machine for updrawing uppers on lasts, having, in combination, a critical gripper arranged to engage the tip end of the upper and constrained to operate in a fixed path, and a pair of floating grippers arranged on opposite sides of the shoe in position to engage the ends of the tip seam and movable automatically under the influence of the upper during their stretching movement to coincide the tip seam with the tip line on the last, substantially as described.

69. A machine for updrawing uppers, having, in combination, a support for an assembled shoe, a gripper, mechanism for relatively actuating the support and gripper to stretch the upper, and automatic means for ending the cycle of operation of said mechanism at the completion of the updraw movement, substantially as described.

70. A machine for updrawing uppers, having, in combination, a support for an assembled shoe, a gripper, mechanism for relatively actuating the support and gripper to stretch the upper, means for ending the cycle of operation of said mechanism at the completion of the updraw movement, and means for varying the point in the updraw movement at which the cycle of operation of said mechanism is ended in accordance with variations in the grades of upper engaged by the gripper, substantially as described.

71. A machine for updrawing uppers, having, in combination, a support for an assembled shoe, a gripper mechanism for relatively actuating the support and gripper to stretch the upper, and automatic means for terminating the operation of said mechanism on the shoe at the completion of the updraw movement, substantially as described.

72. A machine for updrawing uppers, having, in combination, a support for an assembled shoe, a plurality of grippers arranged to engage the upper at separated points, mechanism for relatively actuating the support and grippers to stretch the upper, and means for terminating the operation of said mechanism on the shoe at the completion of the updraw movement, substantially as described.

73. A machine for updrawing uppers, having, in combination, a support for an assembled shoe, a plurality of grippers arranged to engage the upper at separated points, mechanism for relatively actuating the support and grippers to stretch the upper, means for terminating the operation of said mechanism on the shoe at the completion of the updraw movement, and means for varying the extent of the updraw movement in accordance with variations in the grades of upper engaged by the gripper, substantially as described.

74. A machine for updrawing uppers, having, in combination, a support for an assembled shoe, a plurality of grippers arranged to engage the upper of the shoe, driving mechanism having a definite limit of extent of movement for elevating the support against the pull of the grippers, and means for interrupting the elevation of the support short of its limit of extent of movement after a predetermined pull has been placed upon the upper, substantially as described.

75. A machine for updrawing uppers, having, in combination, a support for an assembled shoe, a plurality of grippers arranged to engage the upper of the shoe, means for elevating the support at a constant rate of speed against the pull of the grippers, and means for stopping the elevation of the support upon the attainment of a predetermined pull upon the upper, substantially as described.

76. A shoe machine, having, in combination, a support, a carrier journaled thereon, and grippers pivoted on the carrier, substantially as described.

77. A shoe machine, having, in combination, a support, a carrier thereon, a gripper jaw pivoted on the carrier and provided with a depending tail, and pressure mechanism carried by the support arranged in the path of movement of the depending tail on the gripper jaw during its pivotal movement in one direction, substantially as described.

78. A shoe machine, having, in combination, a support, a carrier journaled thereon provided with a pair of spaced plates, a pivoted gripper jaw provided with a depending tail movable between the plates, and a leaf spring carried at one end on the support and provided on its free end with a pin extending loosely between the plates in the path of movement of the depending tail on the gripper jaw during its pivotal movement in one direction, substantially as described.

79. A shoe machine, having, in combination, a carrier, a gripper jaw pivoted near its rear end to the carrier, a second gripper jaw pivoted near its front end to the first gripper jaw, a handle for closing the jaws pivoted to the first gripper jaw in the rear of the pivotal connection between the carrier and the first jaw, a latch on the carrier, and a pin on the handle arranged to slip beneath the head on the latch during the updraw movement of the grippers and to engage the head on the latch during the return of the grippers from their updrawn position and thus actuate the handle to open the gripper jaws, substantially as described.

80. A machine for updrawing uppers having insoles thereon, having, in combination, a support for the last, and a grippers support mounted to tip about an axis located substantially at the projection of a point on the edge of the insole on a plane beneath the support, substantially as described.

81. A machine for updrawing uppers having insoles thereon, having, in combination, a support for the last, a grippers support mounted to tip about an axis located substantially at the projection of a point on the edge of the insole on a plane beneath the support, a carrier journaled on the support, and grippers pivoted on the carrier, substantially as described.

82. A shoe machine, having, in combination, a plurality of grippers, manual means for closing the grippers upon the upper, means for elevating the closed grippers through variable distances from an initial upper-engaging position to a final position to updraw the upper, means for returning the closed grippers to their initial position, and automatic means for opening the grippers during their return to initial position, substantially as described.

83. A machine for fitting uppers to lasts having insoles thereon, having, in combination, a work support, and means for fitting the upper to the edge face only of the insole, substantially as described.

84. A machine for fitting uppers to lasts having insoles thereon, having, in combination, means for fitting the upper, and means for binding the fitted upper to the edge face only of the insole, substantially as described.

85. A machine for fitting uppers to lasts having insoles thereon, having, in combination, means for fitting the upper, means for binding the fitted upper to the edge face only of the insole, and means for clamping the bound upper, substantially as described.

86. A machine for fitting uppers to lasts having insoles thereon, having, in combination, means for fitting the upper, and means for clamping the fitted upper to the edge face only of the insole, substantially as described.

87. A machine for fitting uppers to lasts having insoles thereon, having, in combination, a work support, means for fitting the upper, and means for binding the fitted upper to the edge face only of the insole, substantially as described.

88. A machine for fitting uppers to lasts having insoles thereon, having, in combination, a work support, means for fitting the upper, means for binding the fitted upper to the edge face only of the insole, and means for clamping the bound upper, substantially as described.

89. A machine for updrawing uppers on lasts having insoles thereon, having, in combination, means for stretching the upper, means for binding the stretched upper to the edge face of the insole, and means for securing the binder to the sides of the shoe entirely outside the peripheral edge of the insole.

90. A machine for fitting uppers to lasts having insoles thereon, having, in combination, means for fitting the upper, means for tensioning a flexible binder on the fitted upper to bind it to the edge face only of the insole, and means for securing the binder to the shoe.

91. A shoe machine, having, in combination, a support for an assembled shoe, a plurality of grippers arranged to engage the upper of the shoe at separated points, mechanism for relatively actuating the support and grippers to updraw the upper, means for automatically stopping the machine at the completion of the updraw movement, and means for effecting a reversal of said relative movement of said support and grippers to release the grippers.

92. A shoe machine, having, in combination, a support for an assembled shoe, a plurality of grippers arranged to engage the upper of the shoe at separated points, and operating mechanism for relatively moving said support and grippers, said mechanism being constructed and arranged to effect an updrawing movement of the upper, to automatically stop the machine at the completion of said updrawing movement, and to cause said grippers to move outwardly away from the shoe after the updrawing movement has been completed.

CHARLES C. BLAKE.
MARK E. FERNALD.